(12) United States Patent
Cruz et al.

(10) Patent No.: US 10,452,607 B2
(45) Date of Patent: Oct. 22, 2019

(54) REUSABLE TRANSFORMATION MECHANISM TO ALLOW MAPPINGS BETWEEN INCOMPATIBLE DATA TYPES

(71) Applicant: Oracle International Corporation, Redwood Shores, CA (US)

(72) Inventors: Rodolfo José Cruz, Foster City, CA (US); Patricio Barletta, Foster City, CA (US); Nicolas Damonte, Redwood Ctiy, CA (US); Juan Allo Ron, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 244 days.

(21) Appl. No.: 15/403,097

(22) Filed: Jan. 10, 2017

(65) Prior Publication Data

US 2018/0075042 A1    Mar. 15, 2018

Related U.S. Application Data

(60) Provisional application No. 62/395,198, filed on Sep. 15, 2016, provisional application No. 62/395,341, filed on Sep. 15, 2016.

(51) Int. Cl.
*G06F 16/11*     (2019.01)
*G06F 16/84*     (2019.01)
(Continued)

(52) U.S. Cl.
CPC ...... *G06F 16/116* (2019.01); *G06F 16/24564* (2019.01); *G06F 16/252* (2019.01); *G06F 16/84* (2019.01)

(58) Field of Classification Search
CPC .......... G06F 17/30569; G06F 17/3092; G06F 17/30914; G06F 17/30563; G06F 17/30292; G06F 17/30076; G06F 17/30554; G06F 17/30917; G06F 17/30294; G06F 17/3056; G06F 17/30584; G06F 17/30303; G06F 17/30557; G06F 17/30091;
(Continued)

(56) References Cited

U.S. PATENT DOCUMENTS

6,064,819 A * 5/2000 Franssen ................. G06F 8/443
                                                         717/144
8,458,582 B2 * 6/2013 Rogers .................. G06F 17/227
                                                         705/26.4
(Continued)

*Primary Examiner* — James Trujillo
*Assistant Examiner* — Michal Lawrence Bogacki
(74) *Attorney, Agent, or Firm* — Trellis IP Law Group, PC (57) ABSTRACT

In one implementation, a data transformation tool is configured to allow a user to specify how types of data should be mapped to another type of data in a reusable fashion. In one implementation, the data transformation tool analyzes data selected for input, the desired data output, and determines a list of potential mappings that may be used between the compliant and non-compliant systems. The mappings may be generated through transformational expressions and defined as a data wrapper. Once the definition of the one or more mappings are defined, data transformation tool generates one or more files allowing the execution of the transformation of the input data to the output data during an execution phase, such as runtime.

20 Claims, 8 Drawing Sheets

(51) Int. Cl.
*G06F 16/2455* (2019.01)
*G06F 16/25* (2019.01)

(58) Field of Classification Search
CPC ......... G06F 17/30424; G06F 17/30604; G06F 17/30516; G06F 17/30595; G06F 17/30893; G06F 17/30457; G06F 17/30979; G06F 17/30637; G06F 17/30017; G06F 17/30607; G06F 17/3053; G06F 16/116; G06F 16/84
See application file for complete search history.

(56) References Cited

U.S. PATENT DOCUMENTS

| | | | |
|---|---|---|---|
| 8,954,476 B2* | 2/2015 | Rosenberg | G06Q 10/00 707/803 |
| 2007/0250829 A1* | 10/2007 | Hillier | H04L 41/022 717/170 |
| 2008/0005144 A1* | 1/2008 | Katz | G06F 17/30569 |
| 2008/0005356 A1* | 1/2008 | Katz | G06F 13/387 709/246 |
| 2010/0324942 A1* | 12/2010 | Rogers | G06Q 40/00 705/4 |
| 2013/0138646 A1* | 5/2013 | Sirer | G06F 17/30545 707/736 |
| 2015/0100542 A1* | 4/2015 | Li | G06F 16/254 707/602 |
| 2015/0186439 A1* | 7/2015 | Cohen | G06F 17/30867 707/741 |
| 2017/0017728 A1* | 1/2017 | Jiao | G06F 17/30498 |

* cited by examiner

REUSABLE TRANSFORMATION MECHANISM TO ALLOW MAPPINGS BETWEEN INCOMPATIBLE DATA TYPES

CROSS REFERENCES TO RELATED APPLICATIONS

This application claims priority from U.S. Provisional Patent Application Ser. No. 62/395,198, entitled REUSABLE TRANSFORMATION MECHANISM TO ALLOW MAPPINGS BETWEEN INCOMPATIBLE DATA TYPES, filed on Sep. 15, 2016 (ORACP0175P), and U.S. Provisional Patent Application Ser. No. 62/395,341, entitled SYSTEM FOR PROCESS CLOUD SERVICE, filed on Sep. 15, 2016 (ORACP0192P) which are hereby incorporated by reference as if set forth in full in this application for all purposes.

BACKGROUND

The following relates to mapping data between various data formats, and more specifically to user interfaces and accompanying features used for transferring information between systems.

One of the most popular formats to transfer information between systems is Extensible Markup Language (XML). XML is a markup language that defines a set of rules for encoding documents in a format that is both human-readable and machine-readable. The specific structure of a software language such as XML is governed by rules that define elements and types of data. Unfortunately, while defined software structure make sense in a specific context for some compliant systems capable of processing such languages, often the defined software structures do not make sense in the context of other systems that are not compliant that the compliant systems communicate with.

On some occasions it's desirable to convert data of one type to another (for example the user may have defined some custom type and have to communicate with another system that understands a slightly different type that the one present). A common approach to this issue is to, for example, have an XSLT (Extensible Stylesheet Language Transformations) file that based on a source XML could generate another which complies with the target schema definition. Unfortunately, writing such XSLT is an extremely technical task that requires familiarity with the XSL standard, knowledge of the underlying representation of the different schema types involved and is commonly error prone.

Therefore, a new and improved method and system of mapping data from one type of data to another is desired.

SUMMARY

In one implementation, a data transformation engine is configured to allow a user to specify how types of data, such as XSD, should be mapped to another type of data in a reusable fashion. In one implementation, the data transformation tool analyzes data selected for input, the desired data output, and determines a list of potential mappings that may be used between the compliant and non-compliant systems. The mappings may be generated through transformational expressions and defined as a data wrapper. Once the definition of the one or more mappings are defined, data transformation tool generates one or more files allowing the execution of the transformation of the input data to the output data during an execution phase, such as runtime.

In other implementations, a data mapping software program is configured to receive source data used with a first system to transform to target data used with a second system, wherein the source data is incompatible with the second system, and the target data is incompatible with the first system; analyze the source data and the target data to determine a mapping function between the source data type and the target data type; generate transformation representation files based on the mapping function; using nodal analysis, iterate over attributes contained in the transformation representation files in order to generate nodes with respect to the mapping function; determine from the transformation representation files whether a mapping between the source data and target data is mandatory; when the mapping is mandatory, and there is no value for an attribute, generate a placeholder node configured to allow the mapping function to be completed, and generate one or more output files with respect to the nodes that when executed maps the source data to the target data.

A further understanding of the nature and the advantages of particular embodiments disclosed herein may be realized by reference of the remaining portions of the specification and the attached drawings.

DETAILED DESCRIPTION OF EMBODIMENTS

Figure 1:
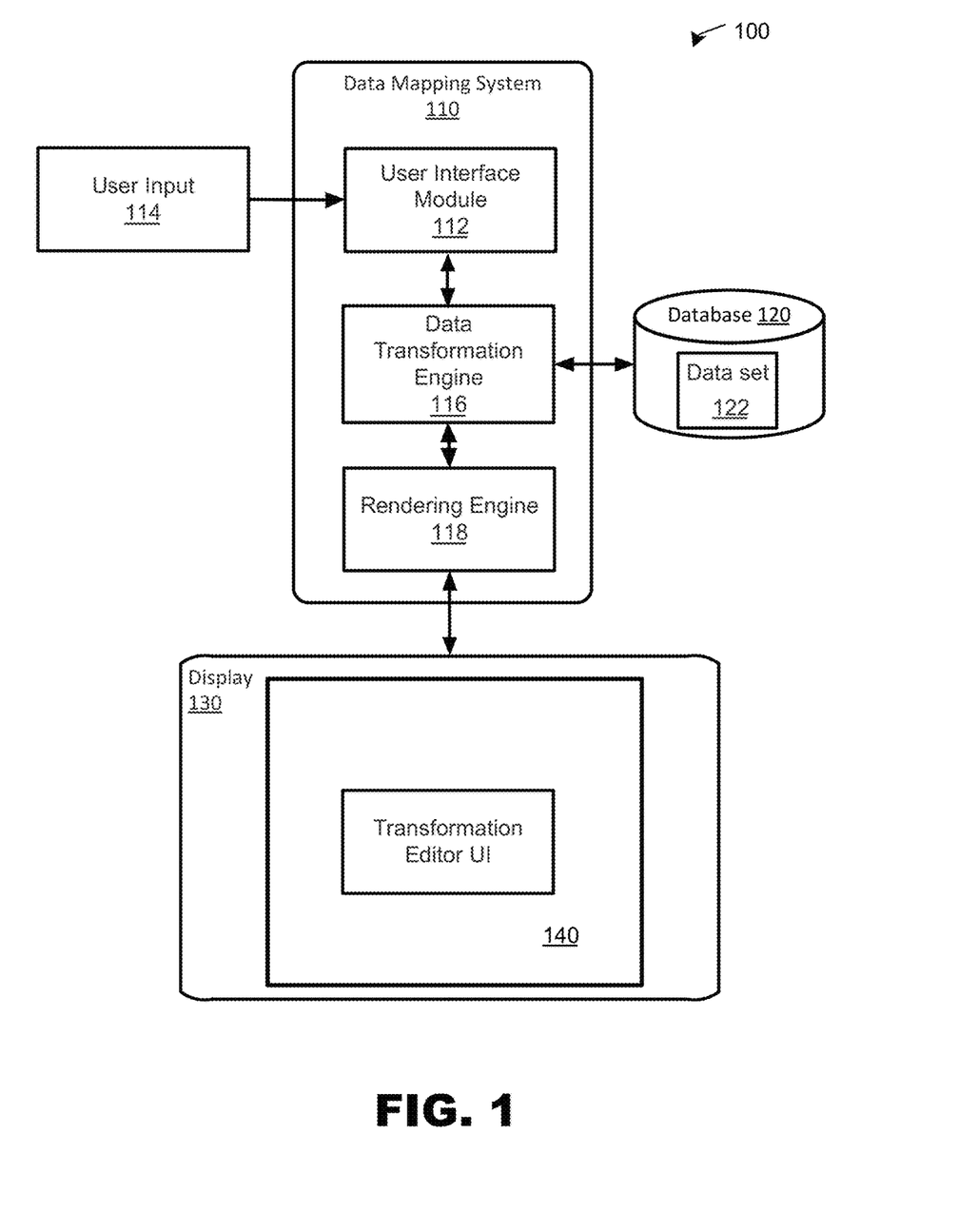
FIG. 1 is a high level illustration of a data mapping system.

FIG. 1 is a high-level block diagram of an exemplary computing system 100 for mapping data between incompatible systems. Computing system 100 may be any computing system, such as an enterprise computing environment, client-server system, and the like. Computing system 100 includes data mapping system 110 configured to process data received from a user interface 114, such as a keyboard, mouse, etc.

Note that the computing system 100 presents a particular example implementation, where computer code for implementing embodiments may be implemented, at least in part, on a server. However, embodiments are not limited thereto. For example, a client-side software application may implement data mapping system 110, or portions thereof, in accordance with the present teachings without requiring communications between the client-side software application and a server.

In one exemplary implementation, data mapping system 110 is connected to display 130 configured to display data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to convert, model, generate, deploy, and maintain data 140.

In other implementations, computing system 100 may include a data source such as database 120. Database 120 may be connected to the data mapping system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to data attributes, data hierarchy, nodal positions, values, summations, visualizations, algorithms, code (e.g., C++, Javascript, JSON, etc.), source, security, hashes, XML, XSD, XSLT, and the like. In addition, data sets 122 may also contain other data, data elements, and information such as metadata, labels, development-time information, run-time information, configuration information, API, interface component information, library information, pointers, and the like.

Data mapping system 110 may include user interface module 112, data transformation engine 116, and rendering engine 118. User interface module 112 may be configured to receive and process data signals and information received from user interface 114. For example, user interface module 112 may be adapted to receive and process data from user input associated with data 140 for processing via data mapping system 110.

In an exemplary implementation, data transformation engine 116 may be adapted to receive data from user interface 114 and/or database 120 for processing thereof. In one configuration, data transformation engine 116 is a software engine configured to receive and process input data from a user thereof pertaining to data 140 from user interface module 114 and/or database 120 in order to generate a mapping to transfer information between compatible and incompatible systems in a reusable fashion.

Data transformation engine 116 in other implementations may be configured as a data analysis tool to perform analysis functions associated with data 140. Such analysis functions may include determining the attributes associated with the data, determining the type of data, determining the values of the data, determining the relationships to other data, interpreting metadata associated with the data, and the like. For example, Data transformation engine 116 may be configured to receive and analyze data sets 122 to determine data compatibility, user interface configuration, data processing instructions, data attributes, data hierarchy, nodes, nodal positions within the hierarchy, values, summations, algorithms, source, security, hashes, and the like, associated with data sets 122. Such data set analysis may include nodal analysis, recursive analysis, and other data analysis techniques.

Data transformation engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

In some configurations, data transformation engine 116 actively examines data sets 122 relative to two or more systems in order to determine whether data sets 122 are incompatible between those systems. In addition, data transformation engine 116 may be configured to analyze data sets to determine mapping information. For example, data transformation engine 116 may be configured to analyze the attributes of a source data set and determine the target attributes needed for a target type of data.

In some scenarios, data transformation engine 116 may be configured to iterate over the target type in the order in which the attributes should appear in the resulting file, such as XML, and decides whether there is a mapping to a target attribute and if that mapping is mandatory. If there is a mapping, the source expression may be converted to a syntax, such as XPath, which defines parts of the target document, and generates a node with the value obtained. If the mapping is mandatory and there is no value, then an empty placeholder node may be generated.

In some implementations, some attributes may include sub-attributes. In this scenario, data transformation engine 116 may be configured to recursively to generate nodes relative to any mappings determined between the source data and target data type. Data transformation engine 116 may also be configured to perform other functions such as writing calls to other data, such as XSLT, to another compatible document, e.g., another XSLT, set proper context, provide loops for processing arrays, etc.

In other implementations, data transformation engine 116 may be configured to actively search for mapping information for example within database 120, over a network, such as the Internet, etc., and actively determine whether the mapping information may be applied for a particular mapping scenario. In this implementation, data transformation engine 116 actively analyzes incompatible data and uses the results of the analysis to search for mapping information and improve mapping accuracy. For example, data transformation engine 116 may be configured to test such mapping information to determine whether such mapping information is accurate. Thus, such analysis uses feedback to improve the operation of one or more processors used in the mapping process by improving data mapping accuracy.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122 bound to data 140. In one implementation, upon receiving instruction from a user, for example, through user interface 114, rendering engine 118 may be configured to generate a real-time display of interactive changes being made to data 140 by a user thereof.

Figure 2:
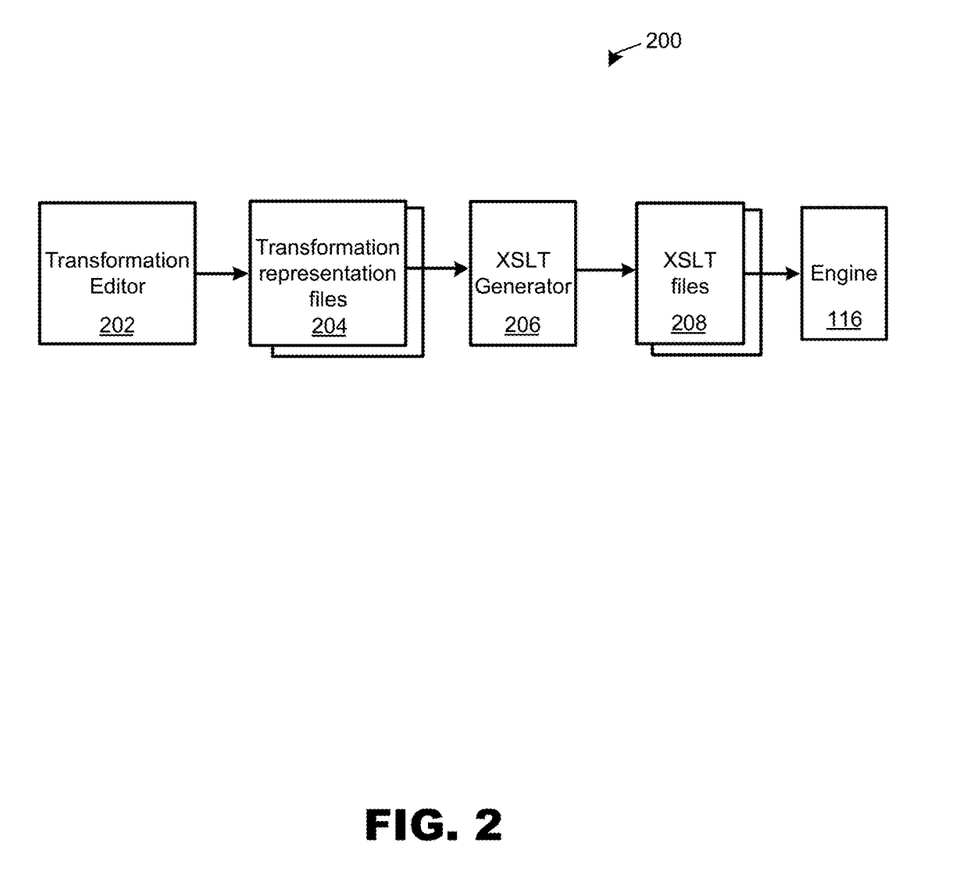
FIG. 2 is a high level diagram of a process used to transform incompatible data types between systems.

FIG. 2 is a high level diagram of a data transformation process 200 used to transform incompatible data types between systems executed for example by data transformation engine 116. In one implementation, data transformation process 200 is configured to provide a data transformation based on an input data type, a target output data type, and a list of mappings between the data types built using, for example, simple expression defined as a wrapper over XPath, and the like. As discussed above, mappings may be determined by querying database 220, networks such as the Internet, and like.

The input data may contain values, constants, expressions, functions, attributes, etc. for assignment to the target output data. In some implementations, once the definition of the mapping is made, an Extensible Stylesheet Language Transformations (XSLT) file is generated to allow the execution of the transformation for a specific XML input during runtime.

Data transformation process 200 may also analyze the mappings to determine which mappings provide improved mapping accuracy and/or data processing efficiency. For example, data transformation process 200 may determine two or more mappings that may be used, where one mapping is more accurate but takes more processing time, whereas another mapping is less accurate but provides faster processing during runtime. In this scenario, if processing speed is more important, then data transformation process 200 may select the mapping or mapping function that provides the faster but less accurate mapping. Alternatively, if accuracy is more important data transformation process 200 may select the mapping or mapping function that provides the slower but more accurate mapping.

In an implementation, data transformation process 200 includes a transformation editor 202, transformation representation filter 204, file generator 206 (such as an XLST generator), output files 208, which are inputted in data transformation engine 116. While data transformation engine 116 is shown as a separate function, data transformation engine 116 may be configured to provide some or all of the functions of data transformation process 200.

In one implementation, transformation editor 202 receives input from a user, for example from user interface 114, to define how any specific type conversion should be made. In some implementations, a transformation may be created with a name, a source type, and a target data type.

Figure 3A:
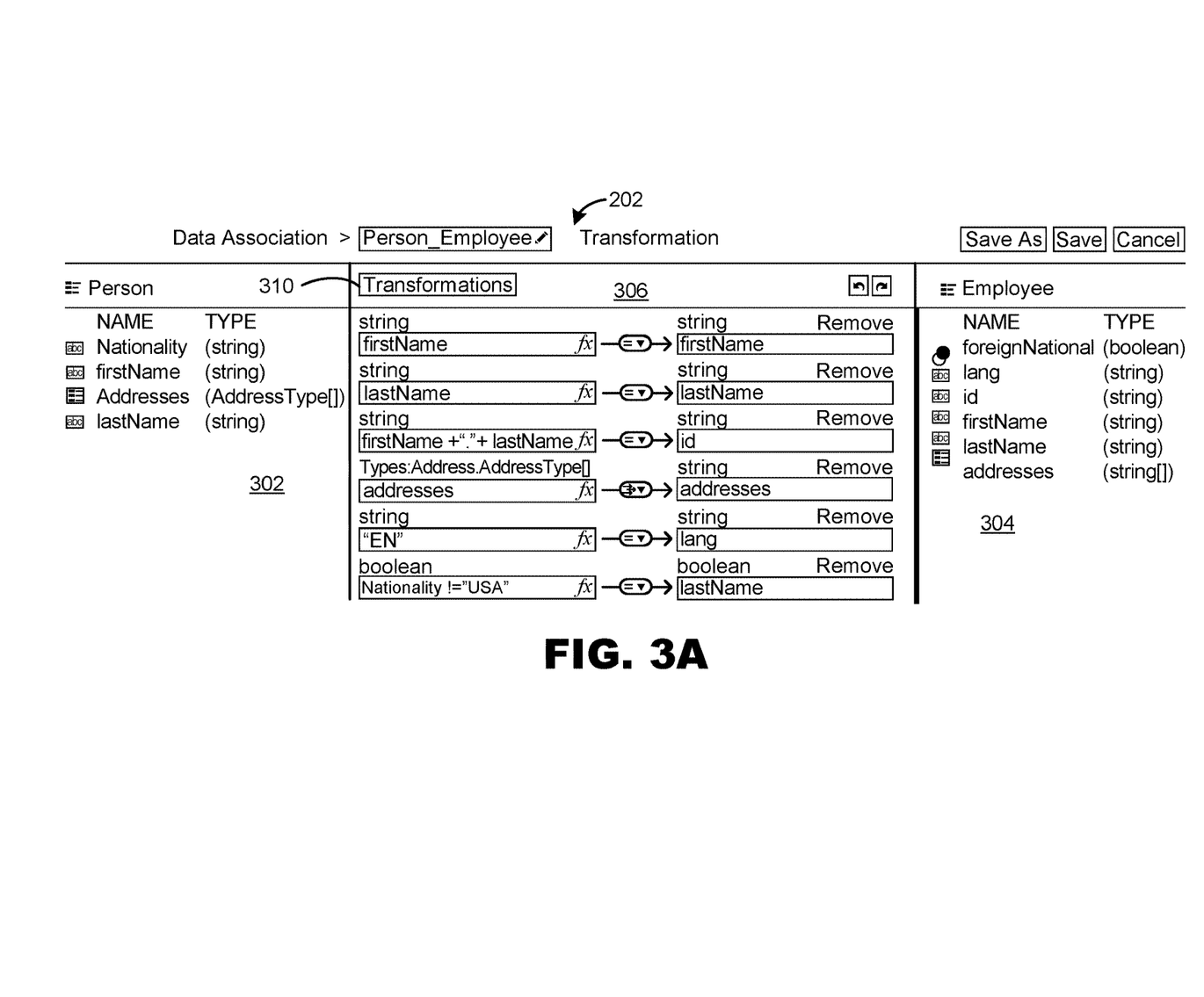
FIGS. 3A-3C are high level diagrams of a transformation editor.
Figure 3B:
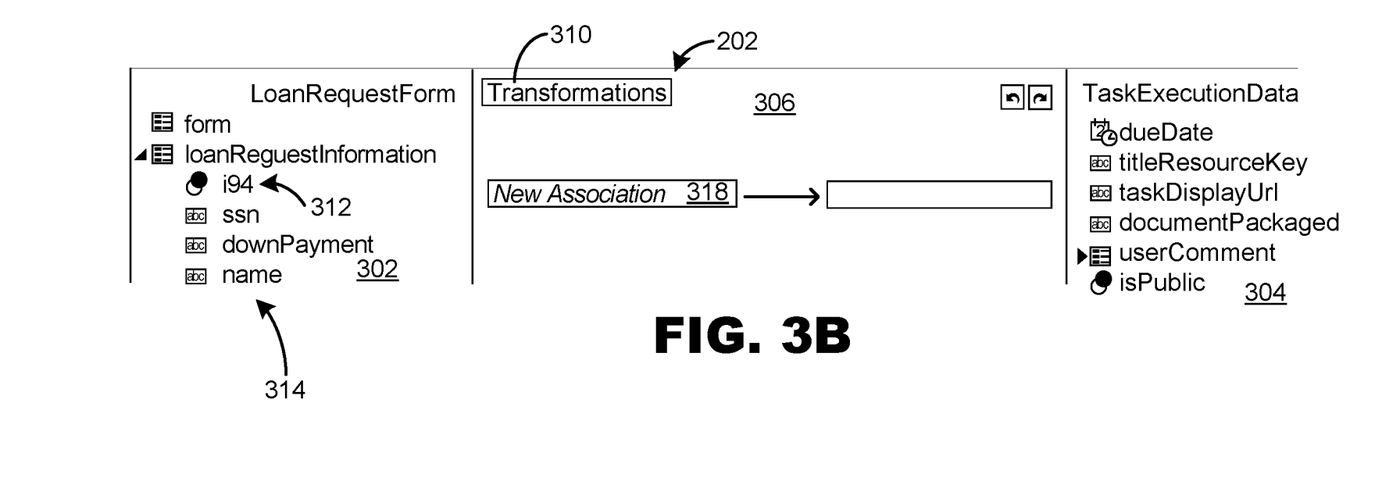
Figure 3C:
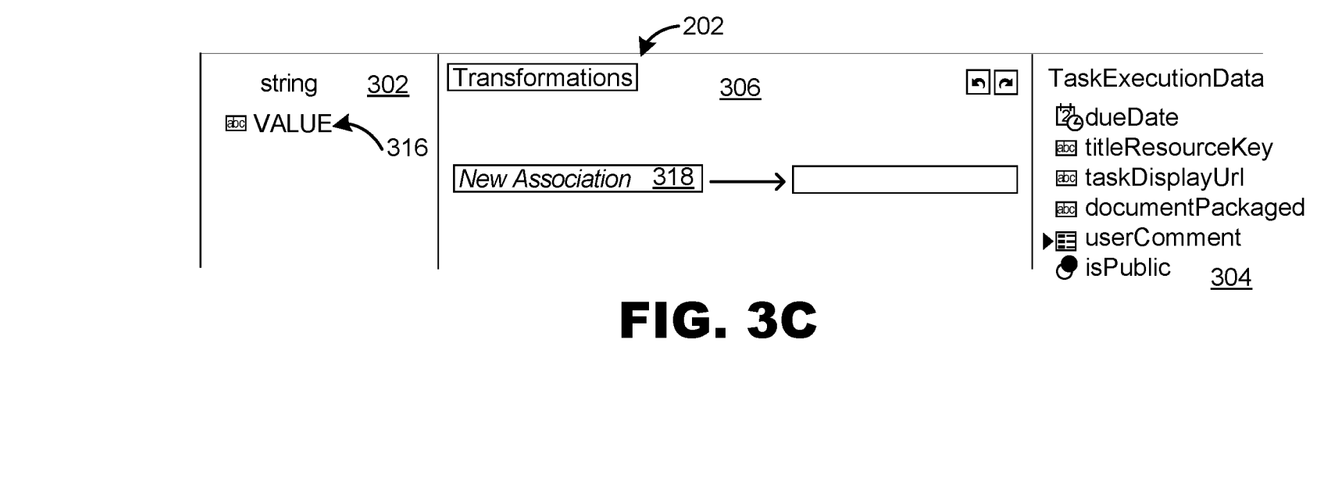

For example, referring now to FIGS. 3A-3C, upon opening transformation editor 202, transformation editor 202 displays two side panels and a central area. In one implementations left panel 302 shows the attributes of the source data type (data objects), right panel 304 shows the attributes of the target type (payload) or the entry parameters transformation editor 202 needs to perform its function, and the central area 306 shows the mappings that have been defined for the transformation. For example, transformation editor 306 may contain a plurality of fields on the left panel 302 and right panel 304 to capture attributes such as strings, types, addresses, expressions, etc. In one configuration, transformations may be initiated selecting transformation button 310.

FIGS. 3B and 3C further illustrate transformation editor 202 in a new transformation configuration. In this scenario, FIG. 3B illustrates mappings related to the payload or entry parameters 312 and the available variables 314. FIG. 3C illustrates transformation editor 202 in a new transformation configuration mapping value attributes of the source data 316 to attributes of the target data 314 when an attribute from the left panel 302 is entered into the "new association" field 318. In some implementations, as shown in FIG. 3C, if a transformation is defined based on a simple type, a special attribute, such as "VALUE" may be presented, which represents the type itself.

In one implementation, to define a mapping using transformation editor 202, users can "drag and drop" or type source/target values into the corresponding part of the mapping. In this example, valid source values may be source type attributes, constants or even complex expressions or functions involving those, written using, for example, in a dotted expression language such as "Simple Expression."

Referring back to FIG. 2, in implementations, such transformations provided by process 200 are also reusable. As such, when the data types don't match the transformations may be referenced in a mapping. Moreover, users can also reorder mappings as needed. Transformation process 200 also provides syntactic and semantic validation (meaning an error may be shown if trying to assign values from incompatible types).

In other implementations, with regard to arrays, data transformation engine 116 automatically loops between the arrays to apply a mapping or transformation. Such looping process may be configured to be complete or truncated depending on the level of accuracy or processing efficiency desired.

Transformations outputted by transformation editor 202 may be persisted into transformation representation files 204 containing references to the source/target type, followed by the corresponding mappings (each including a reference to another transformation, if applicable).

In some implementations, file generator 206 is configured to generate mapping files, such as XSLT files, for each transformation based on the representation files generated by transformation editor 202 and the target type information provided by the corresponding schema.

In implementations, file generator 206 iterates over the attributes contained in the target type in the order they should appear in the resulting output data, such as XML, and looks if there's some mapping referring to it (since mappings may be put into any order). Such iteration may be configured to be complete or truncated depending on the level of accuracy or processing efficiency desired.

If there is a mapping, file generator 206 converts the source expression into a syntax, such as XPath, and generate at least one node with that value. Because file generator 206 may not force a user to provide all the target attributes, if there is no mapping but the attribute is mandatory file generator 206 may generate an empty or "placeholder" node. The placeholder node may be configured as an active or passive proxy node configured to allow the mapping function to be completed.

If the mapping is optional, but it's a complex type (meaning this attribute has inner attributes), and there's a mapping for one of those file generator 206 generates the node and recursively processes the inner attributes. In addition, file generator 206 may write calls to another syntax, such as XSLTs when necessary setting the proper context first, generating loops in case of arrays, etc.

Data transformation engine 116 may be configured to look for corresponding files, such as XSLT files, whenever there is a data association that uses a transformation. For example, data transformation engine 116 may initiate a query for corresponding XSLT and instantiates an XSL processor with it along with the source XML, getting as a result an XML compliant file with the target schema type, loaded with the desired values.

Figure 4A:
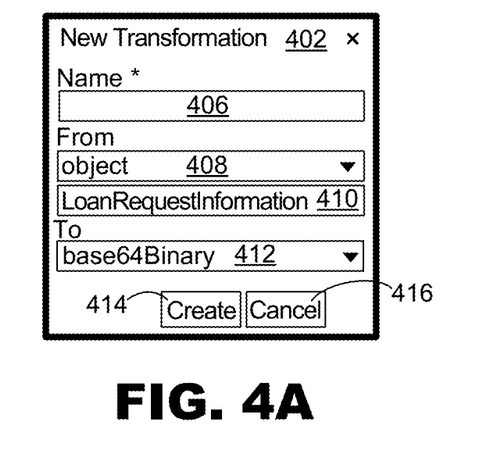
FIGS. 4A and 4B illustrate UI functions for managing transformations.
Figure 4B:
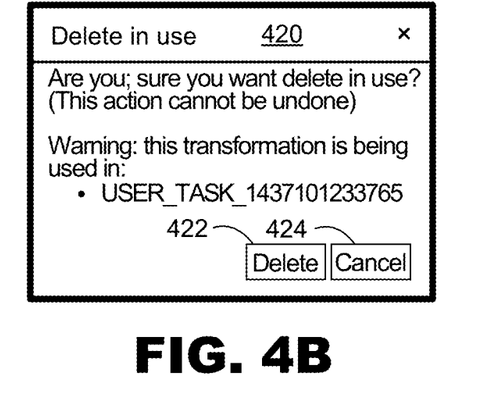

FIGS. 4A and 4B illustrate UI functions that may be used to manage transformations. In one implementation, FIG. 4A illustrates a data association editor 402. In some scenarios, transformations may be managed using, for example, data association editor 402 which works in conjunction with data transformation engine 116, to operate a data association editor for a set of mappings. When activated, data association editor 402 provides a dialog listing current transformations.

If some scenarios, when a large number of transformations are defined, the new association editor 402 provides a list which may be filtered, for example, by typing part of the transformation name in a search box 406. The list of transformations displays both the transformation name and the source and target types of the transformation. Like activities, transformations may be identified internally by a generated ID, so more than one transformation may have the same name.

When activated to create a new transformation, transformation editor 402 creates a child dialog for specifying the transformation's name and selecting the source and target types of the transformation. If for example, "object" is selected from the dropdown of search box 408, a second dropdown selection box 410 will allow a business type to be selected. A "To" dropdown box 412 is used to designate the target data source. If button "Create" 414 is activated, a create function may be enabled creating a new transformation. A cancel button 416 may be used to cancel the transformation.

When a user or data mapping system 100 decides to delete a transformation in use, for example to conserve processing time, allow for flexibility when changing between transformations, etc., transformations may be deleted. FIG. 4B illustrates a transformation deleting function interface 420. Transformation deleting function may be activated by selecting delete button 422 to delete transformations that are in use. Cancel button 424 may be used to cancel the transformation deleting function.

FIGS. 5A-D illustrate mapping icons used to convey the status of a data mapping. In one implementation, the validity of a mapping in either a data association or transformation is indicated by one of four icons. Icon 502A may be given a color (or design, indicia, etc.) and attribute to indicate a valid direct mapping (one without a transformation applied), while a different icon color and attribute indicates an invalid direct mapping.

Figure 5A:
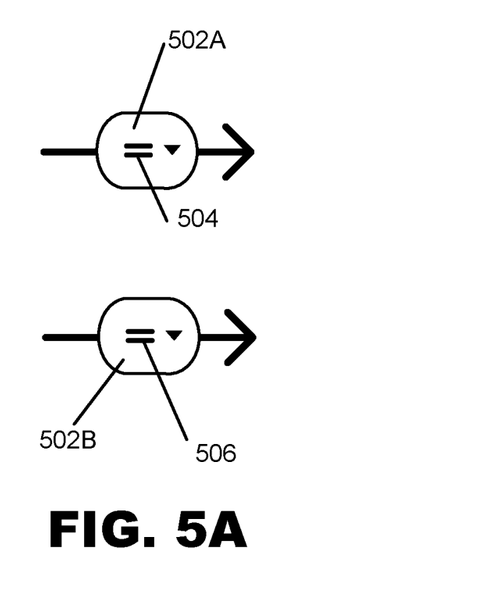
FIGS. 5A-D illustrate mapping icons for conveying status of a data mapping.

As illustrated in FIG. 5A, for example, mapping icon 502A may have a green color "=" sign 504 (or other color, design, indicia, etc.) indicating a valid direct mapping. Whereas, mapping icon 502B with a color of "red" "=" sign 506 (or other color, design, indicia, etc.) may indicate an invalid direct mapping.

Figure 5B:
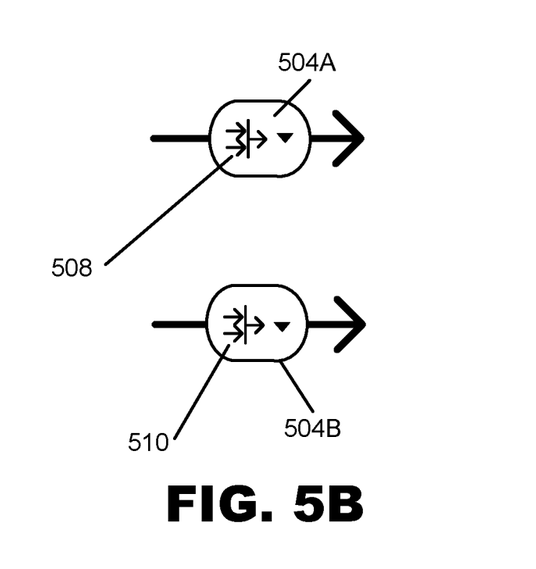

As illustrated in FIG. 5B, when a mapping is complete, a different set of icons 505 may be used. For example, mapping icon 505A may have an icon 508 that is the color "green" (or other color, design, indicia, etc.) indicating a valid direct mapping has been complete. Whereas, for an invalid or incomplete mapping, mapping icon 505B may be an invalid icon 510 that is the color "red" (or other color, design, indicia, etc.) indicating an invalid or incomplete mapping.

In addition, mapping icons 508 and 510 may be configured as "shallow" icons. Such shallow icons may indicate a valid mapping has occurred even though there may have been some validation errors when the transformation was applied. For example, if there is a mapping between two types of data, mapping icon 508 may be configured to show the mapping was valid even though there was an error in the mapping using the applied transformation. In this scenario, mapping icon 508 indicates that while there was not an error in the original mapping, an error resulted when the transformation was applied. Similarly, mapping icon 510 may be configured to show that while the project was validated, the transformation had an error. This further increases processor efficiency by reducing the number of mapping errors listed in, for example, validation reports.

Figure 5C:
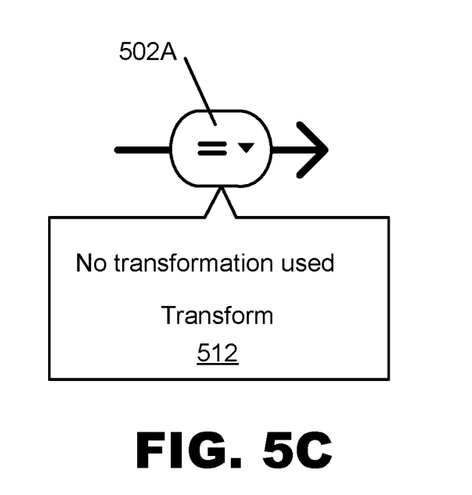
Figure 5D:
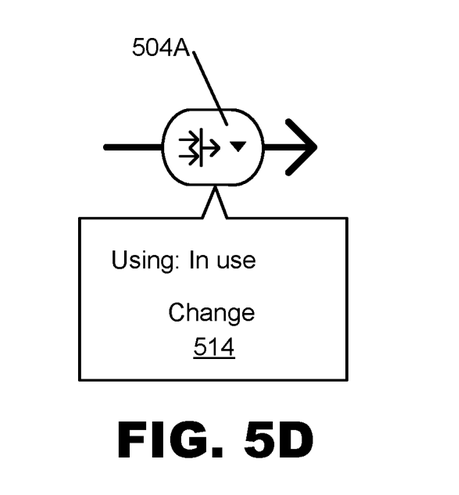

As illustrated in FIG. 5C, if a user selects a mapping arrow for icon 502A, for example, a dialogue box 512 may be presented indicating the name of the transformation applied. Similarly, in FIG. 5D, if a user selects a mapping arrow for icon 505A, for example, dialogue box 514 may be presented indicating the name of the transformation applied. In some implementations, dialog box 512 may be selected to initiate or continue a transformation. Similarly, dialog box 514 may be selected to initiate a change or interrupt a transformation while the transformation is in process.

Figure 6:
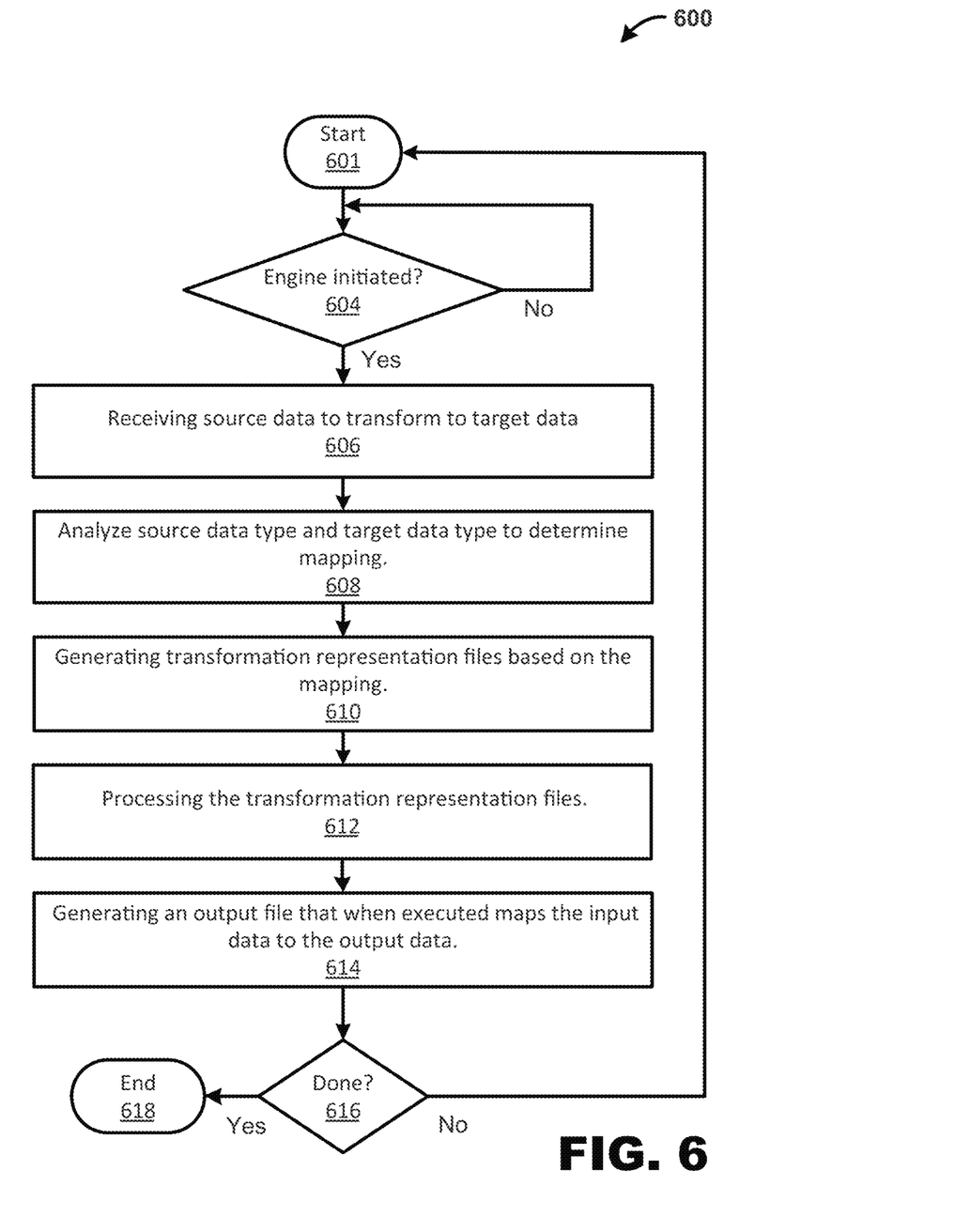
FIG. 6 is a flow diagram of an example method adapted for use with implementations, and variations thereof, illustrated in FIGS. 1-5.

FIG. 6 is a flow diagram of an example method 600 adapted for use with implementations, and variations thereof, illustrated in FIGS. 1-5. Method 600 may be entered into for example when data mapping system 110 is activated. At 604, method 600 determines if data transformation engine 116 has been activated. If not, method 600 returns to 601. However, if so, method 600 proceeds to 606 to receive data containing source data and input types, target data and output types, and a transformation function, such as a listing or other function, that maps the input data type to the output data type.

At 608, the source data is received and analyzed, for example by data transformation engine 116, to determine the mapping between the source data and the target data. In some implementations, a mapping function utilizes the input type, the output type, and a list of mappings between them, generated, for example, using a simple expression defined as a wrapper over XPath.

In other implementations, method 600 analyzes the source and target data to determine which mapping function would allow for improvement of processor function or accuracy of the transformation process. For example, in some scenarios, method 600 searches local and external databases connected to networks such as the Internet to find and recursively check a series of transformation functions to determine which function given the source and data type would be the best for improving the function of the computer processing the data and/or the accuracy of the data mapping. As such, method 600 adapts to changing computer processing conditions to allow processors to be more efficient and/or accurate in their processing of the mapping function.

At 610, method 600 generates transformation representation files that may be used as intermediate files before processing. In one implementation XSLT files are generated for each transformation during the application deployment based on the representation files generated by the transformation editor 202 and the target type information provided by the corresponding schema.

In this scenario, at 612 method 600 iterates over the attributes contained in the target type in the order they should appear in the resulting XML and looks if there's some mapping referring to it (since mappings may be placed in any order). If there is a mapping method 600 converts the source expression to data, such as XPath, and generates a node with that value.

If there was no mapping, but the attribute is deemed mandatory, method 600 generates an empty placeholder node, which is configured as a proxy node. The proxy node is configured to allow method 600 to continue without interrupting the mapping process. For example, whereas mapping errors may occur during mapping, the proxy node is configured to change and/or adapt to the mapping errors in order to anticipate and allow for and/or correct such errors such that the mapping may continue uninterrupted.

In other scenarios, if the mapping is a complex type of mapping (e.g., the attribute has inner attributes), method 600 generates the nodes and processes the inner attributes recursively. Method 600 may also be configured to write calls to another XSLTs when necessary setting the proper context first, generating loops in case of arrays, etc.

At 614, method 600 generates one or more output files that when executed, for example, by data mapping system 110, map the input data to the output data. In addition to, or in lieu of, analyzing the source files and output files as discussed supra, such output files may be utilized by method 600 to determine whether other mapping functions are more processor efficient or more accurate. For example, to conserve processing efficiency, method 600 may select a mapping function that allows for a mapping function that uses less processor function, while providing mapping accuracy within a predetermined accuracy threshold. Similarly, to conserve mapping accuracy, method 600 may select a mapping function that allows for a mapping function that increases mapping accuracy within a predetermined accuracy threshold at the expense of processor accuracy.

At 616, method 600 checks whether the process is complete, and if so, ends at 618. However, if the process is not complete, method 600 returns to 601.

Figure 7:
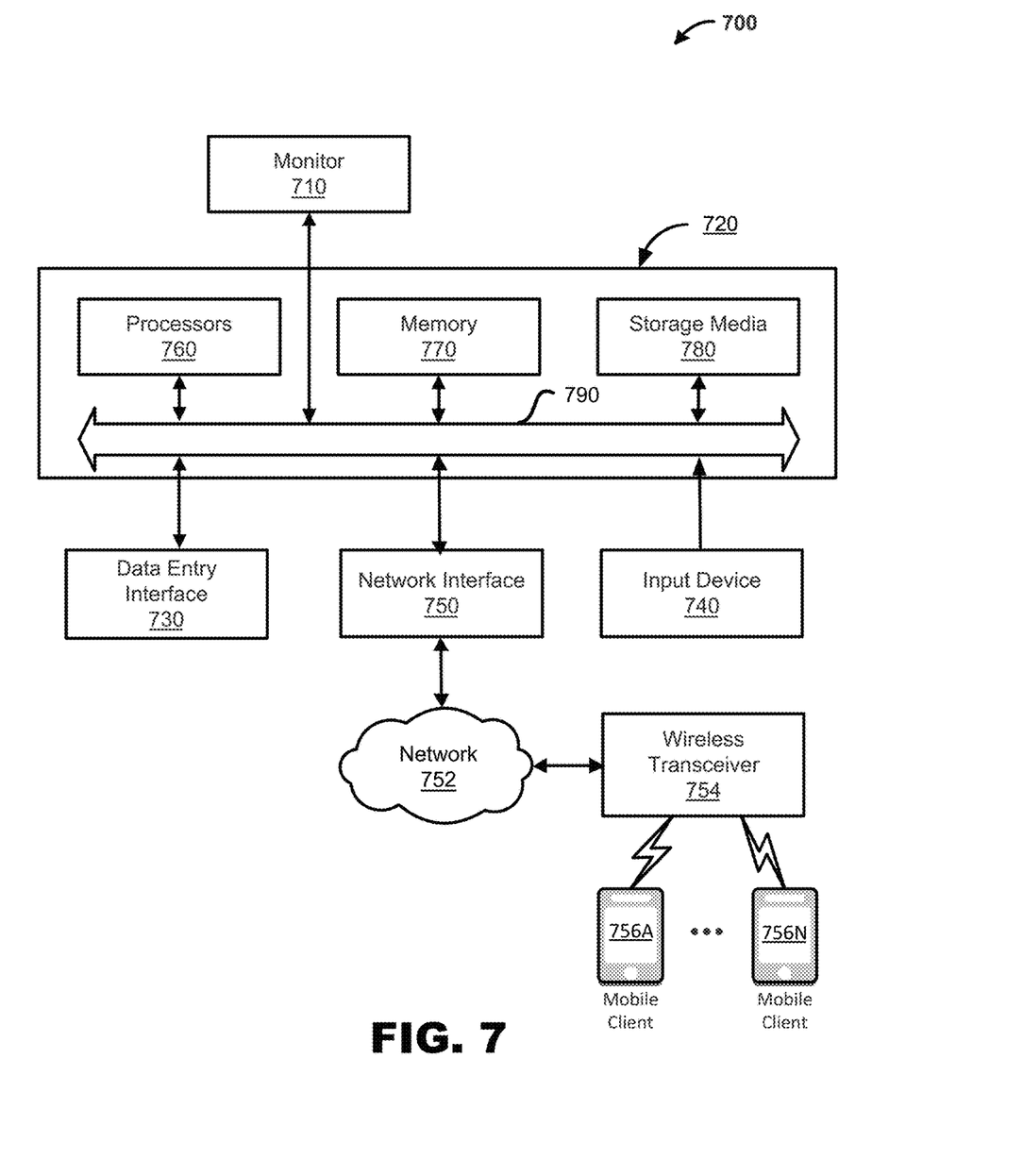
FIG. 7 is a high-level block diagram of an exemplary computer and communication system.

FIG. 7 is a block diagram of an exemplary computer system 700 for use with implementations described herein. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as one or more processors 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 770 and Storage media 780 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   receiving source data used with a first system to transform to target data used with a second system, wherein the source data is incompatible with the second system, and the target data is incompatible with the first system;
   analyzing the source data and the target data to determine a mapping function between the source data and the target data;
   receiving an input selecting a type of the mapping function;
   in response to the input selecting the type of the mapping function configured to increase mapping accuracy in exchange for decreasing processor efficiency, selecting the mapping function that increases mapping accuracy in exchange for decreased processor efficiency;
   in response to the input selecting the type of the mapping function configured to increase processor efficiency in exchange for decreased mapping accuracy, selecting the mapping function that increases processor efficiency in exchange for decreased mapping accuracy;
   generating transformation representation files based on the mapping function;
   using nodal analysis, iterating over attributes contained in the transformation representation files in order to generate nodes with respect to the mapping function;
   determining from the transformation representation files whether a mapping between the source data and target data is mandatory;
   when the mapping between the source data and target data is mandatory and there is no value for an attribute, generating a placeholder node used to allow the mapping function to be completed;
   generating one or more output files with respect to the nodes that when executed maps the source data to the target data;
   analyzing the one or more output files to detect the mapping errors;
   in response to detecting a first mapping error during run-time execution of the mapping that requires the placeholder node to be configured as a passive placeholder node, configuring the placeholder node to be the passive placeholder node and setting a value for an indicator icon that the mapping is valid but contains an error; and
   in response to detecting a second mapping error during run-time execution of the mapping that requires the placeholder node to be configured as an active placeholder node, configuring the placeholder node to the active placeholder node configured to anticipate and allow for the second mapping errors such that the mapping function continues uninterrupted.

2. The computer readable medium of claim 1, wherein the source data comprises an XML file incompatible with the second system.

3. The computer readable medium of claim 1, wherein the one or more output files comprises an XML file incompatible with the first system.

4. The computer readable medium of claim 1, further comprising analyzing the transformation representation files to determine the mapping function.

5. The computer readable medium of claim 4, further comprising generating a XSLT file based on the mapping function.

6. The computer readable medium of claim 1, further comprising analyzing incompatibilities between the source data and the target data to determine mapping incompatibilities between the source data and the target data.

7. The computer readable medium of claim 6, further comprising generating a results file indicative of incompatibilities between the source data and the target data based on the mapping incompatibilities.

8. The computer readable medium of claim 7, further comprising using the results file, searching at least one network connected database for the mapping function configured to improve mapping accuracy.

9. The computer readable medium of claim 7, further comprising using the results file, searching at least one network connected database for the mapping function configured to improve processor mapping efficiency.

10. The computer readable medium of claim 1, further comprising using the nodal analysis to analyze an order of the nodes to determine an order of the mapping function.

11. A processor implemented method comprising:
    receiving source data used with a first system to transform to target data used with a second system, wherein the source data is incompatible with the second system, and the target data is incompatible with the first system;
    analyzing the source data and the target data to determine a mapping function between the source data and the target data;
    receiving an input selecting a type of the mapping function;
    in response to the input selecting the type of the mapping function configured to increase mapping accuracy in exchange for decreasing processor efficiency, selecting the mapping function that increases mapping accuracy in exchange for decreased processor efficiency;
    in response to the input selecting the type of the mapping function configured to increase processor efficiency in exchange for decreased mapping accuracy, selecting the mapping function that increases processor efficiency in exchange for decreased mapping accuracy;
    generating transformation representation files based on the mapping function;
    using nodal analysis, iterating over attributes contained in the transformation representation files in order to generate nodes with respect to the mapping function;
    determining from the transformation representation files whether a mapping between the source data and target data is mandatory;
    when the mapping between the source data and target data is mandatory and there is no value for an attribute, generating a placeholder node configured to allow the mapping function to be completed;
    generating one or more output files with respect to the nodes that when executed maps the source data to the target data;

analyzing the one or more output files to detect the mapping errors;

in response to detecting a first mapping error during run-time execution of the mapping that requires the placeholder node to be configured as a passive placeholder node, configuring the placeholder node to be the passive placeholder node and setting a value for an indicator icon that the mapping is valid but contains an error; and in response to detecting a second mapping error during run-time execution of the mapping that requires the placeholder node to be configured as an active placeholder node, configuring the placeholder node to the active placeholder node configured to anticipate and allow for the second mapping errors such that the mapping function continues uninterrupted.

12. The method of claim 11, wherein the source data comprises an XML file incompatible with the second system.

13. The method of claim 11, wherein the one or more output files comprises an XML file incompatible with the first system.

14. The method of claim 11, further comprising analyzing the transformation representation files to determine the mapping function.

15. The method of claim 14, further comprising generating a XSLT file based on the mapping function.

16. The method of claim 11, further comprising analyzing incompatibilities between the source data and the target data to determine mapping incompatibilities between the source data and the target data.

17. The method of claim 16, further comprising generating a results file indicative of incompatibilities between the source data and the target data based on the mapping incompatibilities.

18. The method of claim 17, further comprising using the results file, searching at least one network connected database for the mapping function configured to improve mapping accuracy.

19. The method of claim 17, further comprising using the results file, searching at least one network connected database for the mapping function configured to improve processor mapping efficiency.

20. An apparatus for mapping data in a computing environment between incompatible systems, the computing environment comprising one or more computing devices in communication with a software mapping application that executes software configured to provide information accessible to the one or more computing devices, a computing device of the one or more computing devices configured to:

receive source data used with a first system to transform to target data used with a second system, wherein the source data is incompatible with the second system, and the target data is incompatible with the first system;

analyze the source data and the target data to determine a mapping function between the source data and the target data;

receive an input selecting a type of the mapping function;

in response to the input selecting the type of the mapping function configured to increase mapping accuracy in exchange for decreasing processor efficiency, select the mapping function that increases mapping accuracy in exchange for decreased processor efficiency;

in response to the input selecting the type of the mapping function configured to increase processor efficiency in exchange for decreased mapping accuracy, select the mapping function that increases processor efficiency in exchange for decreased mapping accuracy;

generate transformation representation files based on the mapping function;

using nodal analysis, iterate over attributes contained in the transformation representation files in order to generate nodes with respect to the mapping function;

determine from the transformation representation files whether a mapping between the source data and target data is mandatory;

when the mapping between the source data and target data is mandatory and there is no value for an attribute, generate a placeholder node configured to allow the mapping function to be completed;

generate one or more output files with respect to the nodes that when executed maps the source data to the target data;

analyzing the one or more output files to detect the mapping errors;

in response to detecting a first mapping error during run-time execution of the mapping that requires the placeholder node to be configured as a passive placeholder node, configuring the placeholder node to be the passive placeholder node and setting a value for an indicator icon that the mapping is valid but contains an error; and in response to detecting a second mapping error during run-time execution of the mapping that requires the placeholder node to be configured as an active placeholder node, configuring the placeholder node to the active placeholder node configured to anticipate and allow for the second mapping errors such that the mapping function continues uninterrupted.

* * * * *